United States Patent
Jacobs

(10) Patent No.: US 6,581,142 B1
(45) Date of Patent: Jun. 17, 2003

(54) COMPUTER PROGRAM PRODUCT AND METHOD FOR PARTIAL PAGING AND EVICTION OF MICROPROCESSOR INSTRUCTIONS IN AN EMBEDDED COMPUTER

(75) Inventor: Brent William Jacobs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 09/653,673

(22) Filed: Sep. 1, 2000

(65) Prior Publication Data (65)

(51) Int. Cl.⁷ .................. G06F 12/08; G06F 13/00
(52) U.S. Cl. ............... 711/159; 711/206; 711/208
(58) Field of Search ................. 711/202, 206, 711/207, 208, 209, 133, 144, 159, 170

(56) References Cited

U.S. PATENT DOCUMENTS

| | | | | |
|---|---|---|---|---|
| 3,979,726 A | * | 9/1976 | Lange et al. .............. | 711/135 |
| 5,146,573 A | * | 9/1992 | Sato et al. ................ | 711/206 |
| 5,418,940 A | * | 5/1995 | Mohan ..................... | 714/5 |
| 5,598,553 A | * | 1/1997 | Richter et al. ........... | 711/209 |
| 6,016,535 A | * | 1/2000 | Krantz et al. ............ | 711/209 |
| 6,035,377 A | * | 3/2000 | James et al. ............. | 711/147 |
| 6,128,711 A | * | 10/2000 | Duncan et al. .......... | 711/159 |
| 6,202,134 B1 | * | 3/2001 | Shirai ....................... | 711/159 |

\* cited by examiner

Primary Examiner—Glenn Gossage
(74) Attorney, Agent, or Firm—Joan Pennington

(57) ABSTRACT

A method and computer program product are provided for partial paging and eviction of microprocessor instructions. Responsive to an instruction page fault, a predefined algorithm is applied to a virtual page address for the identified instruction page fault to identify a page table entry group within a volatile memory. Next, searching an identified page table entry group for a free or open page table entry is performed. Responsive to an identified open page table entry, a partial page is copied from a non-volatile memory to a corresponding partial page within the volatile memory. Responsive to failing to identify an open page table entry, a virtual page residing within the volatile memory is selected for eviction based upon at least one of determining which virtual page, of all virtual pages residing in the volatile memory and within the identified page table entry group, has been evicted a fewest number of times; which virtual page has fewest partial pages resident, and which virtual page has been resident longest.

17 Claims, 8 Drawing Sheets

COMPUTER PROGRAM PRODUCT AND METHOD FOR PARTIAL PAGING AND EVICTION OF MICROPROCESSOR INSTRUCTIONS IN AN EMBEDDED COMPUTER

FIELD OF THE INVENTION

The present invention relates generally to the data processing field, and more particularly, relates to a method for partial paging and eviction of microprocessor instructions in an embedded computer.

DESCRIPTION OF THE RELATED ART

In a computer system where paging of microprocessor instructions is necessary, the computer system performance is limited in instances where processor utilization is required for data movement due to paging of microprocessor instructions.

FIG. 2 illustrates conventional sequential steps for moving a virtual page into a physical page or conventional virtual to physical address translation. FIG. 3 illustrates a conventional page table and a page table, a page table entry group and a page table entry relationship 300. A page table 302 is made up of a number of page table entry groups 304; this number is normally dependent on the implementation of the processor's memory management unit. Each page table entry group 304 is made up of a number of page table entries 306; this is normally a fixed number, such as illustrated by page table entry group 308. Each virtual address maps to a specific page table entry group or groups 304 and can occupy any of the page table entries 306 within that group or groups 304. Each page table entry 306 also has a mapping to a specific physical page.

Referring to FIG. 2, moving a virtual page into a physical page is triggered by an instruction page fault in the processor as indicated in a block 200. Then the processor performs a hashing algorithm on the virtual address to determine or identify to which page table entry group this virtual address belongs as indicated in a block 202. The identified page table entry group is searched for a free or open entry which does not currently map a virtual page to a physical page as indicated in a block 204. If a free page table entry is not found at decision block 206, then a page table entry must be selected in which the data for the virtual page will be evicted from the physical page as indicated in a block 208. If a free page table entry is found at decision block 206 or after a page is selected for eviction at block 208, then the data for the entire new virtual page is moved into the physical page in the page table entry as indicated in a block 210. Then the virtual page is mapped to the physical page within the processor as indicated in a block 212.

A need exists for a mechanism for partial paging and eviction of microprocessor instructions in an embedded computer. As used in the following description and claims, the terms partial and partial page mean a unit of memory that is a fraction of a page.

SUMMARY OF THE INVENTION

A principal object of the present invention is to provide a method and computer program product for partial paging and eviction of microprocessor instructions in an embedded computer. Other important objects of the present invention are to provide such method and computer program product for partial paging and eviction of microprocessor instructions in an embedded computer substantially without negative effect and that overcome many of the disadvantages of prior art arrangements.

In brief, a method and computer program product are provided for partial paging and eviction of microprocessor instructions. Responsive to an instruction page fault, a predefined algorithm is applied to a virtual page address for the identified instruction page fault to identify a page table entry group within a volatile memory. Next searching an identified page table entry group for an open page table entry is performed. Responsive to an identified open page table entry, a partial page is copied from a non-volatile memory to a corresponding partial page within the volatile memory. Responsive to failing to identify an open page table entry, a virtual page residing within the volatile memory is selected for eviction.

In accordance with features of the invention, a virtual page residing within the volatile memory is selected for eviction based upon at least one of determining which virtual page of all virtual pages residing in the volatile memory and within the identified page table entry group that has been evicted a fewest number of times; determining which virtual page of all virtual pages residing in the volatile memory and within the identified page table entry group that has fewest partial pages resident and determining which virtual page of all virtual pages residing in the volatile memory and within the identified page table entry group that has been resident longest.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
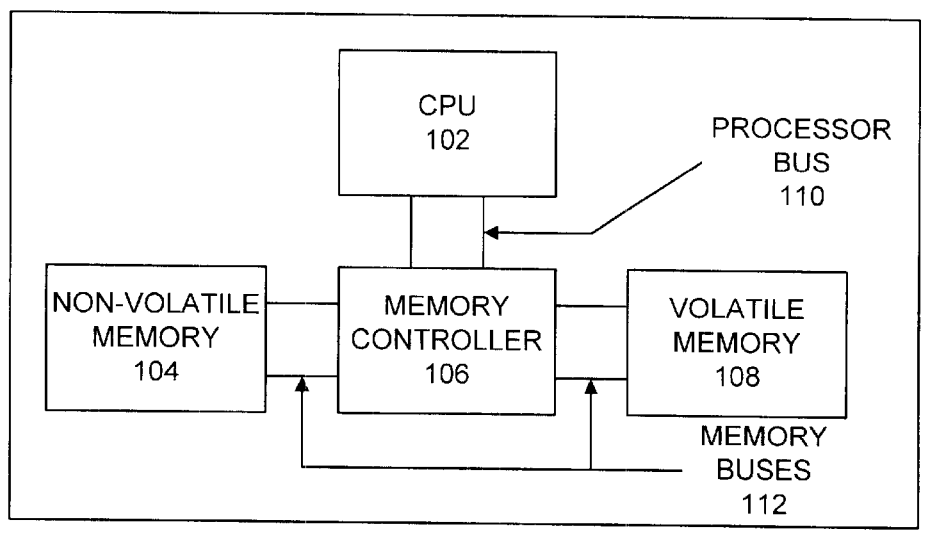
FIG. 1 is a block diagram representation illustrating a computer system for implementing partial paging and eviction of microprocessor instructions in an embedded computer in accordance with the preferred embodiment.
Figure 2:
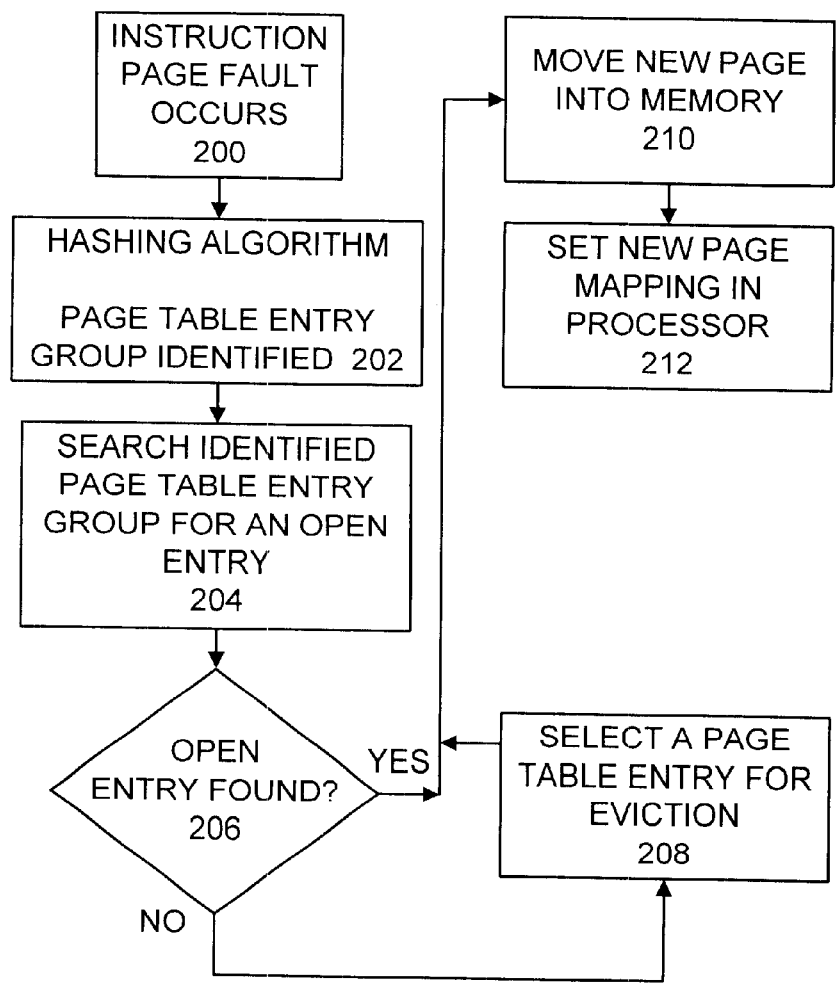
FIG. 2 is a flow chart illustrating conventional sequential steps for moving a virtual page into a physical page or conventional virtual to physical address translation.
Figure 3:
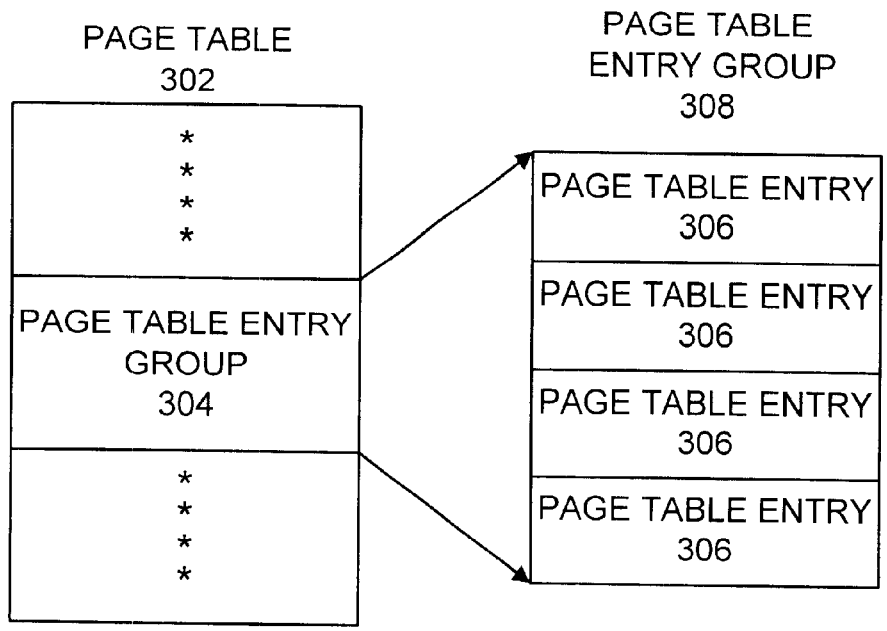
FIG. 3 is a diagram illustrating a conventional page table, page table entry group and a page table entry relationship.

Having reference now to the drawings, in FIG. 1, there is shown a computer system of the preferred embodiment generally designated by the reference character 100. As shown in FIG. 1, computer system 100 includes a central processor unit (CPU) 102, a non-volatile memory 104, a memory controller 106, and a volatile memory 108. CPU 102 is connected to the memory controller 106 by a processor bus 110. Memory controller 106 is connected to the non-volatile memory 104 and the volatile memory 108 by memory buses 112. In accordance with features of the preferred embodiment, non-volatile memory 104 contains CPU instructions that are copied into the volatile memory 108 for execution by the CPU 102.

Figure 5A:
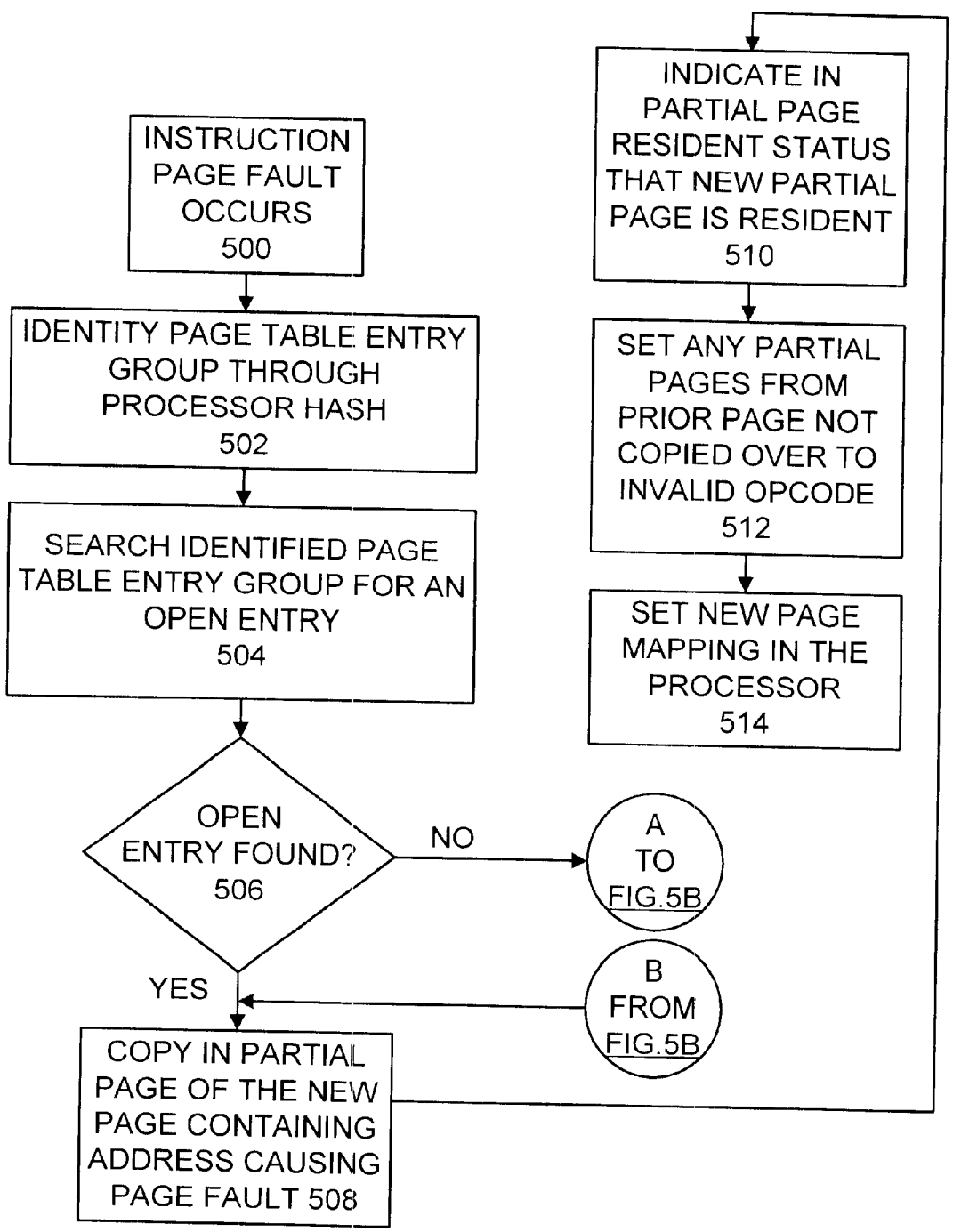
FIGS. 5A and 5B are flow charts illustrating sequential steps for bringing a new virtual page into physical memory using partial paging in accordance with the preferred embodiment.
Figure 5B:
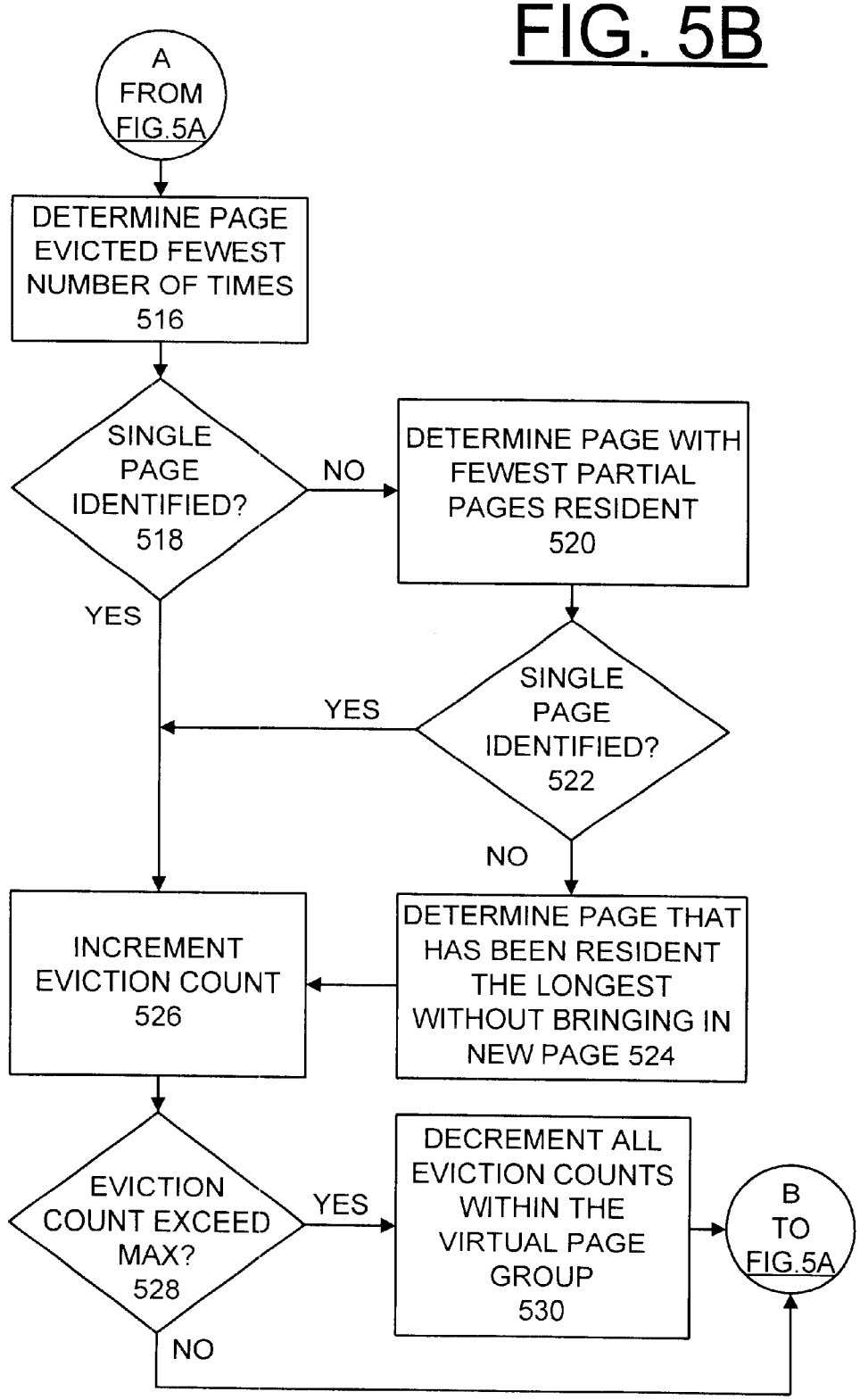
Figure 6:
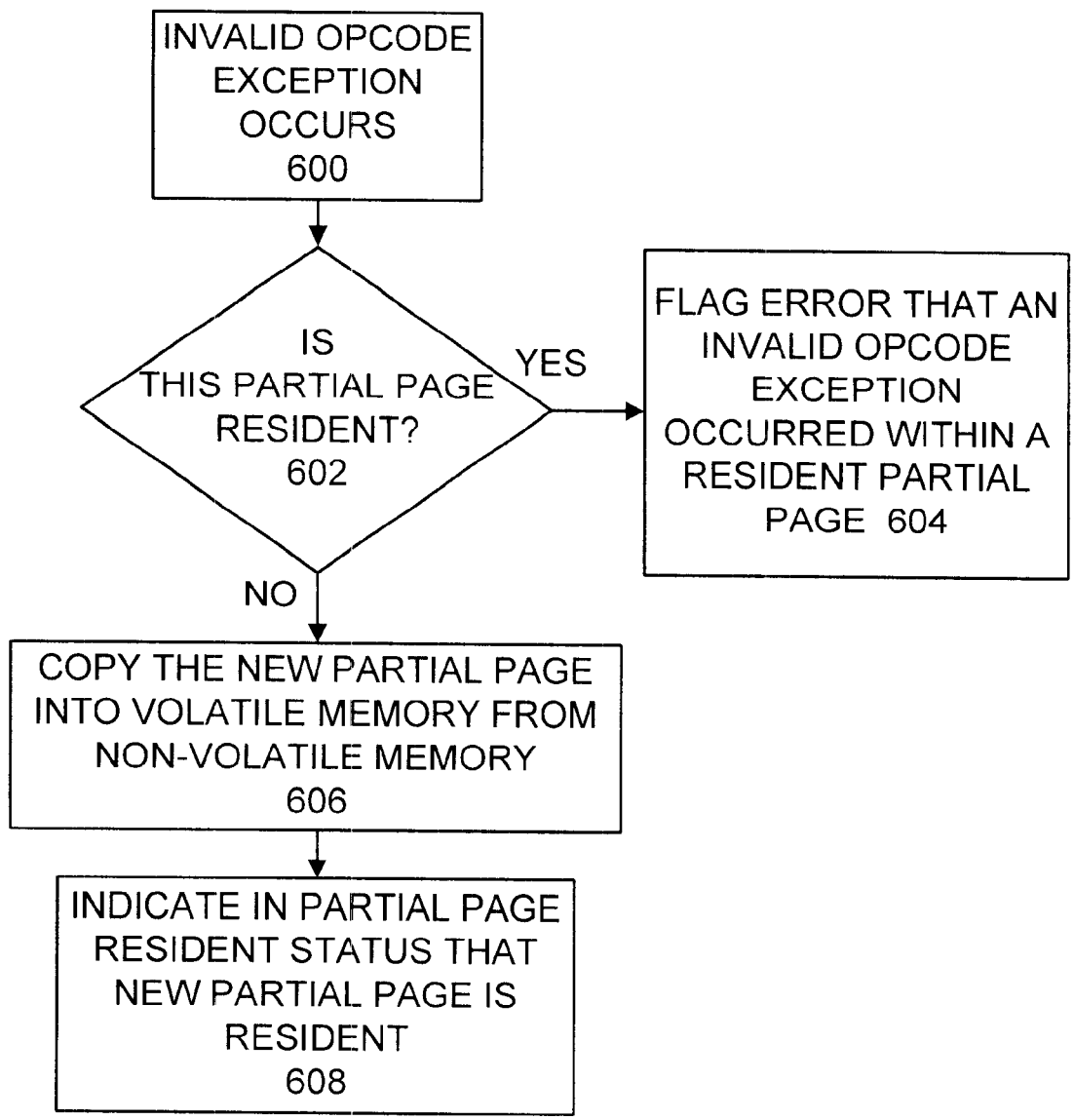
FIG. 6 is a flow chart illustrating exemplary sequential steps for moving partial pages into volatile or physical memory, after a virtual page has been established in physical memory in accordance with the preferred embodiment.

Central processor unit 102 is suitably programmed to execute the flow charts of FIGS. 5A, 5B and 6 of the preferred embodiment. Computer 100 may be implemented using any suitable computer, such as an International Business Machines (IBM) computer.

In accordance with features of the preferred embodiment, overhead for paging of microprocessor instructions, where processor utilization is required to do the actual data movement, is reduced by paging in only portions of a needed page, and then using page management information to determine cast out order. The present invention provides a more efficient method of paging microprocessor instructions from the non-volatile memory 104 to the volatile memory 108, and then casting out instructions from the volatile memory 108. All pages within the volatile memory 108 that are possible targets are initialized to a state such that all memory locations within the page contain invalid microprocessor instructions. The microprocessor instructions within the non-volatile memory 104 are grouped into partial pages of equal size that is a fraction of a page size.

In accordance with features of the preferred embodiment, when an instruction page fault is encountered, the partial page where the instruction resides is located within the non-volatile memory 104. Then a microprocessor's virtual memory hash algorithm determines a set of volatile memory pages where this new page can be mapped. If at least one of the physical pages is not in use, then the partial page is copied from non-volatile memory 104 into the corresponding partial page within the volatile memory 108, and this partial page is set to be in use. When attempting to execute an instruction within a volatile memory page mapped by the microprocessor and within a partial page that has not been copied from non-volatile memory 104, the microprocessor 102 generates an invalid opcode exception. The invalid opcode exception handler checks to see if the partial page is in use; if not, it finds the correct partial page in non-volatile memory 104, copies it to volatile memory 108 and marks the partial page as in use. If all of the volatile memory pages where the instruction page fault maps are in use then one of the volatile memory pages is selected for eviction. A particular page is selected for eviction based upon how many times it has previously been evicted, the amount of data movement required to page it back into volatile memory, and the order which it was made resident relative to other resident pages.

In accordance with features of the preferred embodiment, the partial paging method of the invention reduces the amount of data moved as compared to conventional paging methods; and importantly thereby reduces the required processor utilization for actual data movement. The partial paging method of the invention takes advantage of the following. Normally only a portion of a page is needed for instruction execution of a function. Portions of a page used previously are paged in on the initial page miss. The amount of data moved is taken into account so that a page requiring less data movement may be paged out more often than a page requiring greater data movement.

Figure 4:
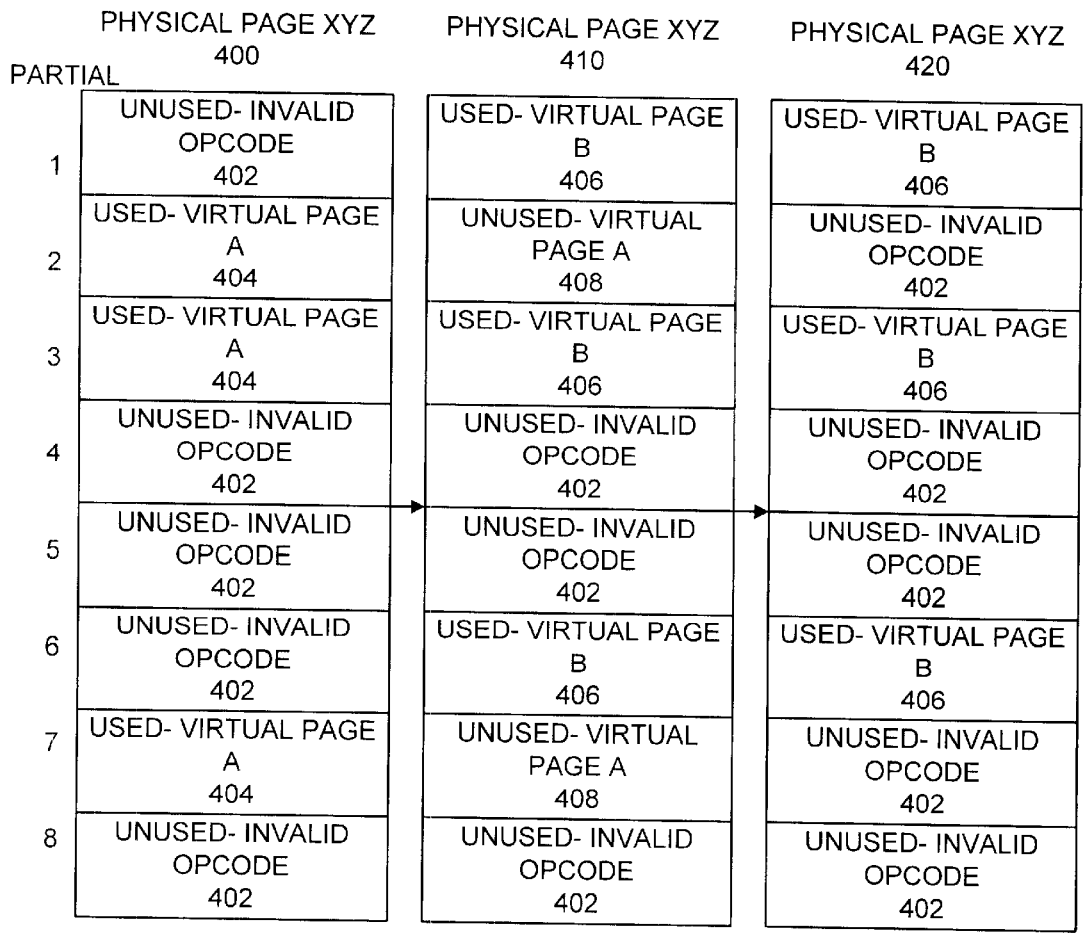
FIG. 4 is a diagram illustrating an example of data movement using partial paging in accordance with the preferred embodiment.

An example of data movement is shown by the three stages of a physical page, indicated in FIG. 4 by physical page XYZ 400, physical page XYZ 410, and physical page XYZ 420. Each physical page XYZ 400, physical page XYZ 410, and physical page XYZ 420 is divided into 8 partial pages 1–8. Physical page XYZ 400 originally contains the data of virtual page A. As shown in FIG. 4, physical page XYZ 400 includes partial pages 1, 4, 5, 6, 8 of unused, invalid opcode 402 and partial pages 2, 3, 7 of used, virtual page A 404. When virtual page A is evicted, then the data for virtual page B is copied into physical page XYZ into the specified partial pages, such as shown in physical page XYZ 410. Physical page XYZ 410 includes partial pages 4, 5, 8 of unused, invalid opcode 402, partial pages 2 and 7 of unused, virtual page A and partial pages 1, 3, and 6 of used, virtual page B 406. In some cases, such as in partial page 3, the data for virtual page B are copied over virtual page A. In the partial pages where data from virtual page B is not copied over virtual page A, the data in these partial pages is set to an invalid opcode for the processor, such as shown in partial pages 2 and 7 of physical page XYZ 420. Physical page XYZ 420 includes partial pages 2, 4, 5, 7, and 8 of unused, invalid opcode 402, and partial pages 1, 3, and 6 of used, virtual page B 406.

Referring now to FIGS. 5A and 5B, there are flow charts illustrating sequential steps for bringing a new virtual page into physical memory using partial paging in accordance with the preferred embodiment. When an instruction page fault occurs indicating that the virtual page is not in the physical memory as indicated in a block 500, the virtual page address is run through a hashing algorithm as indicated in a block 502 to identify a page table entry group or groups. The identified page table entry group or groups are then searched as indicated in a block 504 for an open page table entry. As indicated in a decision block 506, if an open entry is not found then the sequential operations continue following entry point A in FIG. 5B. When an open entry is found then the partial page containing the virtual address causing the page fault is copied into physical memory as indicated in a block 508. An indicator is set in the partial page resident status of this virtual page showing that this partial page is now resident in physical memory as indicated in a block 510. Any partial pages from the previous virtual page which resided in physical memory which have not been copied over by the new virtual page are set to an invalid processor opcode as indicated in a block 512. Lastly this new virtual to physical page mapping is set in the processor as indicated in a block 514.

Referring now to FIG. 5B following entry point A from decision block 506 in FIG. 5A, when an open entry is not found then one of the virtual pages currently residing in physical memory must be evicted. This is done by first determining which virtual page, amongst the virtual pages currently resident and within the specified page table entry group, has been evicted the fewest number of times as indicated in a block 516. If a single page can not be identified, as determined in a decision block 518, then it is determined which virtual page, amongst the virtual pages currently resident and within the specified page table entry group, has the fewest number of partial pages currently resident as indicated in a block 520. If a single page can not be identified, as determined in a decision block 522, then it is determined which virtual page, amongst the virtual pages currently resident and within the specified page table entry group, has been resident the longest without bringing in a new partial page as indicated in a block 524. If a single page can be identified at decision block 518 or decision block 522 and after a virtual page resident the longest is identified at block 524, then an eviction count for the particular selected page is incremented as indicated in a block 526. Once the eviction count for the particular selected page has been incremented at block 526, this page's eviction count is tested to see if a predetermined maximum is exceeded as indicated in a decision block 528. If the page's eviction count exceeds the predetermined maximum, then all eviction counts within the virtual page group are decremented as indicated in a block 530. If the page's eviction count does not exceed the predetermined maximum, or after all eviction counts within the virtual page group are decremented, then the partial page for the new page is copied into physical memory at block 508 in FIG. 5A following entry point B. Then the sequential steps continue with blocks 510, 512, and 514 of FIG. 5A as described above.

Referring now to FIG. 6, there is shown a flow chart illustrating exemplary sequential steps for moving partial pages into volatile or physical memory, after a virtual page has been established in physical memory in accordance with the preferred embodiment. An invalid opcode exception will occur for a partial page that is not resident, while the virtual page of the partial page is resident as indicated in a block 600. A check is performed after the invalid opcode exception occurs to determine if the partial page is resident or not as indicated in a decision block 602. If the partial page that the invalid opcode exception occurred within is found to be resident at decision block 602, then an error is flagged and handled indicating that an invalid opcode exception occurred within a resident partial page as indicated in a block 604. If the partial page generating the invalid opcode exception is not resident as determined at decision block 602, then the partial page is copied from non-volatile memory to volatile memory as indicated in a block 606. An indicator is set in the partial page resident status of this virtual page showing that this partial page is now resident in physical memory as indicated in a block 608.

Figure 7:
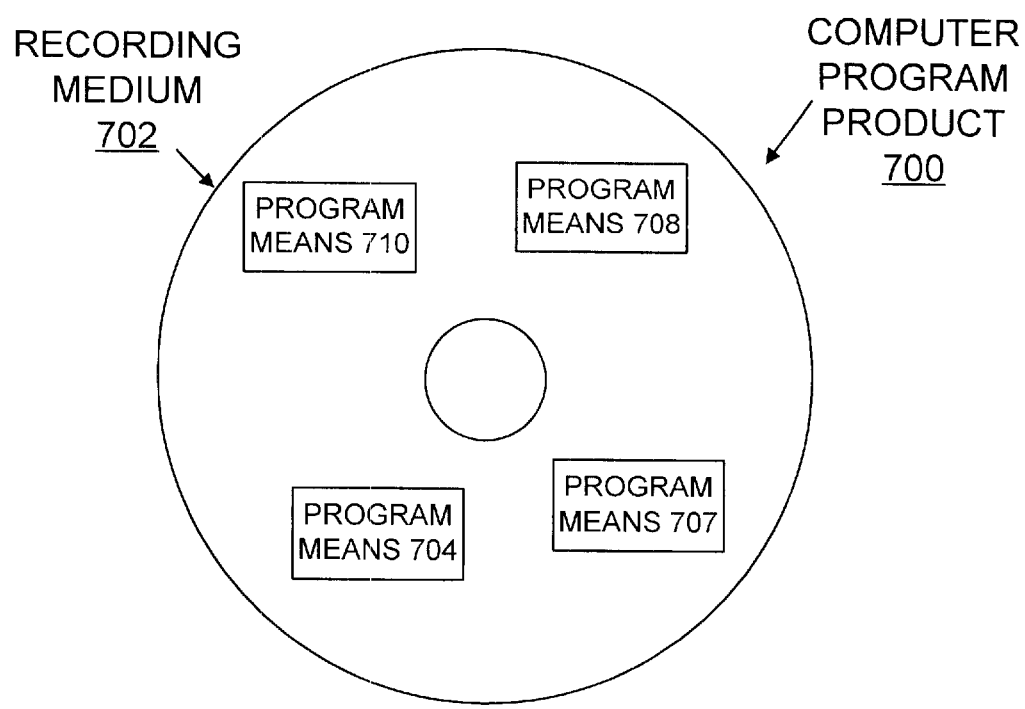
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or compact disc read only memory (CD-ROM), a tape, a transmission type media such as a digital or analog communications link, or a similar computer program product. Recording medium 702 stores program means 704, 706, 708, 710 on the medium 702 for carrying out the method for partial paging and eviction of microprocessor instructions of the preferred embodiment in the system 100 of FIG. 1.

A sequence of program instructions or a logical assembly of one or more interrelated modules defined by the recorded program means 704, 706, 708, 710, direct the computer system 100 for partial paging and eviction of microprocessor instructions of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for partial paging and eviction of microprocessor instructions performed by a processor comprising the steps of:
    identifying an instruction page fault;
    applying a predefined algorithm to a virtual page address for said identified instruction page fault for identifying a page table entry group within a volatile memory;
    searching an identified page table entry group for an open page table entry;
    responsive to an identified open page table entry, copying a partial page from a non-volatile memory to a corresponding partial page within said volatile memory; and
    responsive to failing to identify an open page table entry, selecting a virtual page residing within said volatile memory for eviction including a step of determining the virtual page of all virtual pages residing in said volatile memory and within said identified page table entry group having been evicted a fewest number of times.

2. A computer-implemented method as recited in claim 1 wherein said instruction page fault indicates a virtual page for said instruction is not resident in said volatile memory.

3. A computer-implemented method as recited in claim 1 wherein the step of applying includes a step of applying a hashing algorithm to said virtual page address for said identified instruction page fault for identifying said page table entry group within said volatile memory.

4. A computer-implemented method as recited in claim 1 wherein the step of copying said partial page includes the step of copying said partial page where said partial page corresponds to a unit of memory that is a fraction of a page.

5. A computer-implemented method as recited in claims 1 further including a step, responsive to copying said partial page, of setting an indicator indicating that said copied partial page is resident in said volatile memory.

6. A computer-implemented method as recited in claim 1 further including a step, responsive to copying said partial page, of identifying any partial pages from a previous virtual page not copied over and setting an indicator for an invalid processor opcode.

7. A computer-implemented method as recited in claim 1 further including a step, responsive to copying said partial page, of setting a new virtual to physical page mapping in the processor.

8. A computer-implemented method as recited in claim 1 wherein the step of selecting further includes a step, responsive to determining said virtual page that has been evicted a fewest number of times, of incrementing an eviction count for said determined virtual page.

9. A computer-implemented method as recited in claim 1 wherein a single virtual page of all virtual pages residing in said volatile memory and within said identified page table entry group that has been evicted a fewest number of times is not identified, and said method further includes steps of determining the virtual page of all virtual pages residing in said volatile memory and within said identified page table entry group having a fewest number of partial pages; and responsive to a single page being identified, incrementing an eviction count for said determined virtual page.

10. A computer-implemented method as recited in claim 1 wherein a single virtual page of all virtual pages residing in said volatile memory and within said identified page table entry group that has been evicted a fewest number of times is not identified, said method further including a step of determining the virtual page of all virtual pages residing in said volatile memory and within said identified page table entry group having been resident longer.

11. A computer-implemented method as recited in claim 10 further including a step of incrementing an eviction count for said determined virtual page.

12. A computer-implemented method as recited in claim 1 further including a step of identifying an invalid opcode exception.

13. A computer-implemented method as recited in claim 12 further including steps of copying a new partial page into said volatile memory; and setting an indication indicating said new partial page is resident.

14. A computer program product for implementing partial paging and eviction of microprocessor instructions in a computer system including a central processor unit, said computer program product including a plurality of computer executable instructions stored on a computer readable medium, wherein said instructions, when executed by said central processor unit, cause the central processor unit to perform the steps of:

identifying an instruction page fault;

applying a predefined algorithm to a virtual page address for said identified instruction page fault for identifying a page table entry group within a volatile memory;

searching an identified page table entry group for an open page table entry;

responsive to an identified open page table entry, copying a partial page from a non-volatile memory to a corresponding partial page within said volatile memory; and responsive to failing to identify an open page table entry, selecting a virtual page residing within said volatile memory for eviction including the step of determining the virtual page of all virtual pages residing in said volatile memory and within said identified page table entry group having been evicted a fewest number of times.

15. A computer program product as recited in claim 14 wherein said instructions, when executed by said central processor unit, cause the central processor unit to perform the step of selecting a virtual page residing within said volatile memory for eviction by performing a step of determining which virtual page of all virtual pages residing in said volatile memory and within said identified page table entry group has a fewest number of partial pages resident.

16. A computer program product as recited in claim 14 wherein said instructions, when executed by said central processor unit, cause the central processor unit to perform the step of selecting a virtual page residing within said volatile memory for eviction by performing a step of determining which virtual page of all virtual pages residing in said volatile memory and within said identified page table entry group has been resident longest.

17. A computer program product as recited in claim 14 wherein said instructions, when executed by said central processor unit, cause the central processor unit to perform steps of: identifying an invalid opcode exception; copying a new partial page into said volatile memory; and setting an indication indicating said new partial page is resident.

* * * * *